(12) United States Patent
Li et al.

(10) Patent No.: US 9,234,998 B2
(45) Date of Patent: Jan. 12, 2016

(54) OPTICAL FIBER WITH A LOW-INDEX CORE AND A CORE GRATING

(71) Applicant: CORNING INCORPORATED, Corning, NY (US)

(72) Inventors: Ming-Jun Li, Horseheads, NY (US); Gaozhu Peng, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 91 days.

(21) Appl. No.: 14/158,979

(22) Filed: Jan. 20, 2014

(65) Prior Publication Data

US 2015/0277033 A1   Oct. 1, 2015

Related U.S. Application Data

(60) Provisional application No. 61/757,870, filed on Jan. 29, 2013.

(51) Int. Cl.
| | |
|---|---|
| *G02B 6/032* | (2006.01) |
| *G02B 6/02* | (2006.01) |
| *C03B 37/018* | (2006.01) |
| *C03B 37/012* | (2006.01) |
| *C03B 37/027* | (2006.01) |

(52) U.S. Cl.
CPC .......... *G02B 6/02304* (2013.01); *C03B 37/018* (2013.01); *C03B 37/01274* (2013.01); *C03B 37/027* (2013.01); *G02B 6/02085* (2013.01); *G02B 6/02152* (2013.01); *C03B 2203/26* (2013.01); *G02B 2006/02157* (2013.01)

(58) Field of Classification Search
CPC ................. G02B 2006/12107; G02B 6/02057; G02B 6/02095; G02F 2201/307; H01S 5/141; H01S 3/1055; H04B 10/2519
USPC ............................ 385/123, 125; 65/404, 421
See application file for complete search history.

(56) References Cited

U.S. PATENT DOCUMENTS

| | | | |
|---|---|---|---|
| 6,535,678 B1 * | 3/2003 | Yamauchi et al. ............ 385/123 |
| 2003/0113065 A1 * | 6/2003 | Ohmura et al. ................ 385/37 |
| 2003/0210725 A1 * | 11/2003 | Prassas et al. ................. 372/50 |
| 2006/0067618 A1 * | 3/2006 | Hill ................................ 385/37 |

OTHER PUBLICATIONS

Weijian Yang et all, "Novel Three-dimensional Hollow-core Waveguide Using High-contrast Sub-wavelength Grating", CLEO2011, paper CThHH4, Baltimore MD, May 1-6, 2011.

(Continued)

*Primary Examiner* — Ellen Kim
(74) *Attorney, Agent, or Firm* — Robert L. Carlson (57) ABSTRACT

An optical fiber with a low-index core and a core grating has a solid and generally cylindrical annular cladding having a refractive index $n_{cl}$, a central axis, an inner surface with a radius r wherein r≥2 μm, an outer surface with a radius R, and an annular thickness ΔR≥10 μm. The fiber core has the radius r and a refractive index $n_c$, wherein $n_{cl}>n_c$. The grating is defined by grating elements that extend from the cladding inner surface into the core and that run generally parallel to the central axis. The grating elements define a period Λ, a width t, a spacing a and a height h, wherein 0.5<Λ/λ<1 and wherein 0.2≤t/a≤3.

22 Claims, 5 Drawing Sheets

(56) References Cited

OTHER PUBLICATIONS

F. Benabid, "Hollow-core photonic bandgap fibre: new light guidance for new science and technology", Phil. Trans. R. Soc. A (2006) 364, 3439-3462.

Yoel Fink, et al., "Guiding Optical Light in Air Using an All-Dielectric Structure", Journal of Lightwave Technology, Vol. 17, No. 11, Nov. 1999, pp. 2039-2041.

* cited by examiner

OPTICAL FIBER WITH A LOW-INDEX CORE AND A CORE GRATING

CROSS REFERENCE TO RELATED APPLICATIONS

This application claims the benefit of priority under 35 U.S.C. §119 of U.S. Provisional Application Ser. No. 61/757,870 filed on Jan. 29, 2013 the contents of which are relied upon and incorporated herein by reference in their entirety as if fully set forth.

FIELD

This disclosure relates to optical fibers, and in particular relates to optical fibers having a low-index core and a core grating.

BACKGROUND ART

Conventional optical fibers have a core with a refractive index that is higher than that of the cladding. However, new types of optical fibers have a core with a refractive index that is lower than that of the cladding (i.e., "a low-index core") and so are referred to herein as low-index fibers. The use of low-index fibers in fiber-based applications is of increasing interest because they can be made to have ultra-low loss and ultra-low nonlinearity. They can be used, for example, in optical communications systems for long-haul transmission or in laser-based optical systems that require the delivery of high optical power from the laser to a device or other optical fiber.

One type of low-index optical fiber is a hollow-core optical fiber. Two types of hollow-core fibers have been demonstrated to date. The first has a photonic bandgap structure that uses a periodic array of longitudinally running air holes in a solid material. The second has a solid cladding formed from multiple layers that surround the hollow core, wherein the multiple layers are configured in a Bragg-grating structure so that light is confined to the core.

Photonic bandgap fibers require a very high air-fill fraction (~95%) to confine the light to the hollow core. Because of the high air-fill fraction, the bridges supporting the periodic air-hole structure are very thin (e.g., about 40-50 nm). Consequently, such bridges are difficult to make and are delicate.

On the other hand, Bragg-grating-based fibers need a very high index contrast to confine the light to the core, which is difficult to achieve using glass material. Bragg fibers have been demonstrated with the high index layer being tellurium (refractive index 4.6) and the low index layer being polymer (refractive index 1.59). Because the tellurium and polymer layers are made by two different processes, the fiber fabrication requires many process steps and is not suitable for large-scale manufacturing.

SUMMARY

An aspect of the disclosure is an optical fiber configured to guide light of an operating wavelength $\lambda$ in at least one guided mode. The fiber has a solid and generally cylindrical annular cladding having a refractive index $n_{cl}$, a central axis, an inner surface with a radius r. In various examples, r≥2 µm, or 2 µm≤r≤200 µm, or 6 µm≤r≤100 µm, or 10 µm≤r≤50 µm. The fiber also has an outer surface with a radius R and an annular thickness $\Delta R = R - r$, wherein $\Delta R \geq 10$ µm. The fiber also has a core disposed along the central axis and surrounded by the cladding. The core has the radius r and a refractive index $n_c$, wherein $n_{cl} > n_c$. The fiber also has a grating defined by grating elements that extend from the cladding inner surface into the core and that run generally parallel to the central axis. The grating elements define a period $\Lambda$, a width t, a spacing a and a height h. In various examples, the ratio $\Lambda/\lambda$ satisfies $0.25 \leq \Lambda/\lambda \leq 1$, or $0.5 \leq \Lambda/\lambda \leq 1$. Also in various examples the ratio t/a satisfies $0.2 \leq t/a \leq 10$, more preferably $0.5 \leq t/a \leq 3$, most preferably $1 \leq t/a \leq 2$.

Another aspect of the disclosure is an optical fiber configured to guide light of an operating wavelength $\lambda$ in at least one guided mode. The fiber has a solid and generally cylindrical annular cladding having a refractive index $n_{cl}$, a central axis, an inner surface with a radius r. In various examples, r satisfies r≥2 µm, or 2 µm≤r≤200 µm, or 6 µm≤r≤100 µm, or 10 µm≤r≤50 µm. The fiber also has a hollow core defined by the cladding inner surface. The hollow core has the radius r and a nominal refractive index $n_c = 1$, wherein $n_{cl} > n_c$. The fiber further has a grating defined by grating elements that extend from the cladding inner surface into the core. The grating elements run longitudinally down the fiber and are generally parallel to the central axis. The grating elements have a width t, a spacing a and a height h and define a grating period $\Lambda = t + a$. In various examples, the ratio $\Lambda/\lambda$ satisfies $0.5 \leq \Lambda/\lambda \leq 1$ or $0.5 \leq \Lambda/\lambda \leq 1$.

Another aspect of the disclosure is a method of forming an optical fiber configured to guide light of an operating wavelength $\lambda$ in at least one guided mode. The method includes forming a bait rod having an outer surface with a first periodic grating formed therein. The method also includes depositing a silica soot layer onto the outer surface of the bait rod to form a soot preform. The method further includes consolidating the soot preform to form a glass preform, wherein the soot layer is converted to a glass layer, wherein the bait rod is to form a hollow core in the glass preform and wherein the glass layer has an inner surface with a second periodic-grating surface structure that is complementary to the first periodic-grating surface structure. The method also includes drawing the glass preform to form the optical fiber, wherein the optical fiber has the following properties:

i) a solid and generally cylindrical annular cladding having a refractive index $n_{cl}$, a central axis, an inner surface with a radius r, which in various examples satisfies r≥2 µm, preferably 2 µm≤r≤200 µm, more preferably 6 µm≤r≤100 µm, most preferably 10 µm≤r≤50 µm, and an outer surface with a radius R and an annular thickness $\Delta R = R - r$, wherein $\Delta R \geq 10$ µm;

ii) a hollow core defined by the cladding inner surface, the hollow core having the radius r and a nominal refractive index $n_c = 1$, wherein $n_{cl} > n_c$;

iii) a grating defined by grating elements that extend from the cladding inner surface into the core, the grating elements running longitudinally down the fiber and being generally parallel to the central axis, wherein the grating elements have a width t, a spacing a and a height h and define a grating period $\Lambda = t + a$, wherein in various examples, the ratio $\Lambda/\lambda$ satisfies $0.25 \leq \Lambda/\lambda \leq 1$ or $0.5 \leq \Lambda/\lambda \leq 1$.

Another aspect of the disclosure is a method of forming an optical fiber configured to guide light of an operating wavelength $\lambda$ in at least one guided mode. The method includes forming a bait rod having an outer surface with a first periodic grating formed therein. The method also includes pressing a silica soot layer onto the outer surface of the bait rod with a pressure to form a soot preform. The method further includes consolidating the pressed soot preform to form a glass preform, wherein the soot layer is converted to a glass layer, wherein the bait rod is to form a hollow core in the glass preform and wherein the glass layer has an inner surface with a second periodic-grating surface structure that is complementary to the first periodic-grating surface structure. The method also includes drawing the glass preform to form the optical fiber, wherein the optical fiber has the following properties:

i) a solid and generally cylindrical annular cladding having a refractive index $n_{cl}$, a central axis, an inner surface with a radius r wherein in various examples, r satisfies r≥2 μm or 2 μm≤r≤200 μm or 6 μm≤r≤100 μm or 10 μm≤r≤50 μm, an outer surface with a radius R and an annular thickness ΔR=R−r, wherein ΔR≥10 μm;

ii) a hollow core defined by the cladding inner surface, the hollow core having the radius r and a nominal refractive index $n_c$=1, wherein $n_{cl}$>$n_c$; and iii) a grating defined by grating elements that extend from the cladding inner surface into the core, the grating elements running longitudinally down the fiber and being generally parallel to the central axis, wherein the grating elements have a width t, a spacing a and a height h and define a grating period Λ=t+a, wherein Λ/λ satisfies either 0.25≤Λ/λ≤1 or 0.5≤Λ/λ≤1.

Another aspect of the disclosure is a method of forming an optical fiber configured to guide light of an operating wavelength λ in at least one guided mode. The method includes extruding a soot preform through an extrusion die that includes a first periodic-grating to define a hollow core with an inner surface that includes a second periodic-surface grating complementary to the first periodic grating structure. The method also includes consolidating the extruded soot preform into a glass preform. The method also includes drawing the glass preform to form the optical fiber, wherein the optical fiber has the following properties:

i) a solid and generally cylindrical annular cladding having a refractive index $n_{cl}$, a central axis, an inner surface with a radius r, wherein in various examples, r satisfies r≥2 μm or 2 μm≤r≤200 μm or 6 μm≤r≤100 μm or 10 μm≤r≤50 μm, an outer surface with a radius R and an annular thickness ΔR=R−r, wherein ΔR≥10 μm;

ii) a hollow core defined by the cladding inner surface, the hollow core having the radius r and a nominal refractive index $n_c$=1, wherein $n_{cl}$>$n_c$; and iii) a grating defined by grating elements that extend from the cladding inner surface into the core, the grating elements running longitudinally down the fiber and being generally parallel to the central axis, wherein the grating elements have a width t, a spacing a and a height h and define a grating period Λ=t+a, wherein in various examples, the ratio Λ/λ satisfies 0.25≤Λ/λ≤1 or 0.5≤Λ/λ≤1.

It is to be understood that both the foregoing general description and the following Detailed Description represent embodiments of the disclosure and are intended to provide an overview or framework for understanding the nature and character of the disclosure as it is claimed. The accompanying drawings are included to provide a further understanding of the disclosure and are incorporated into and constitute a part of this specification. The drawings illustrate various embodiments of the disclosure and together with the description serve to explain the principles and operations of the disclosure.

Additional features and advantages of the disclosure are set forth in the Detailed Description that follows, and in part will be readily apparent to those skilled in the art from that description or recognized by practicing the disclosure as described herein, including the Detailed Description that follows, the claims, and the appended drawings.

The claims as set forth below are incorporated into and constitute a part of the Detailed Description set forth below.

Additional features and advantages of the disclosure are set forth in the Detailed Description that follows and will be apparent to those skilled in the art from the description or recognized by practicing the disclosure as described herein, together with the claims and appended drawings.

Cartesian coordinates are shown in certain of the Figures for the sake of reference and are not intended as limiting with respect to direction or orientation.

DETAILED DESCRIPTION

Figure 1:
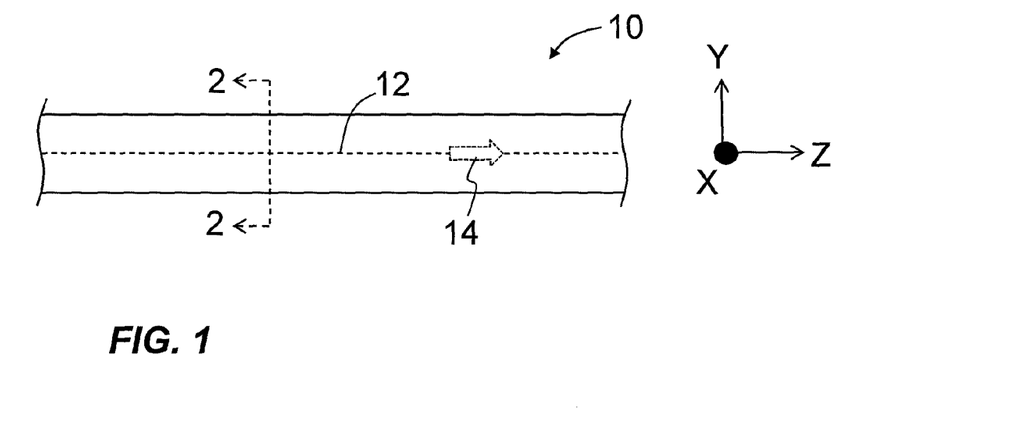
FIG. 1 is a side view of the low-index optical fiber 10 disclosed herein.
Figure 2:
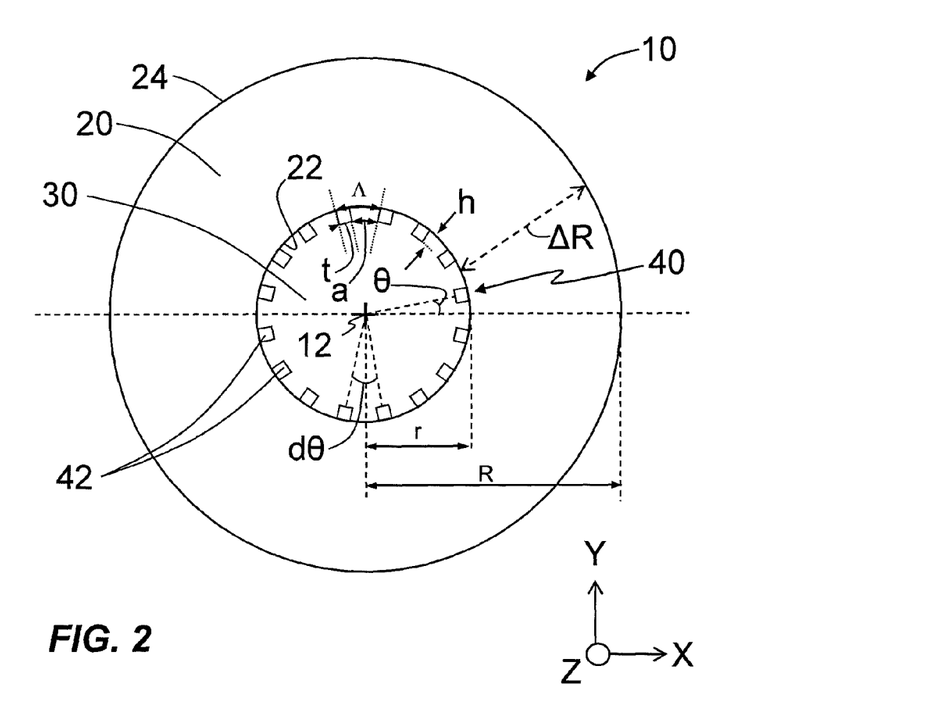
FIG. 2 is a cross-sectional view of the low-index optical fiber as indicated by the line 2-2 in FIG. 1.

FIG. 1 is a side view of the low-index optical fiber ("fiber") 10 disclosed herein, and FIG. 2 is a cross-sectional view thereof as indicated by the line 2-2 in FIG. 1. The fiber 10 has a central axis 12 and is configured to guide light 14 having a wavelength λ, referred to herein as the operating wavelength of the fiber. The fiber 10 has a solid and generally cylindrical annular cladding 20 centered on central axis 12 and having an inner surface 22 and an outer surface 24. The cladding 20 has a refractive index $n_{cl}$, an inner radius r extending from central axis 12 to cladding inner surface 22 and an outer radius R extending from the central axis to cladding outer surface 24. The cladding 20 has an annular width ΔR defined by ΔR=R−r. In an example, ΔR>10 μm. In an example, cladding 20 is a unitary structure, i.e., it consists of a single material, and is not formed by layers of different materials.

The cladding 20 surrounds a core 30 that has a refractive index $n_c$<$n_{cl}$, and an outer radius r, i.e., the same radius as the inner radius of cladding 20. The core 30 can be hollow ($n_c$=1), in which case cladding inner surface 22 defines the core. In another example, core 30 can be made of solid material such as silica glass or other materials that satisfy $n_{cl}$>$n_c$. In various examples, the radius r can be in the range from 2 μm≤r≤200 μm or 6 μm≤r≤100 μm or 6 μm≤r≤50 μm. In an example, the radius R can be in the range 50 μm≤R≤500 μm, which serves to keep the fiber relatively flexible.

If fiber flexibility is not required, the radius R can be greater than 500 μm, for example 1 mm, 2 mm or 5 mm. In an example, one or more protective layers (e.g., one or more polymer coatings) (not shown) can be deposited or otherwise disposed on outer surface 24 of cladding 20. In an example, core 30 consists of a single material (e.g., air, silica, etc.).

The inner surface 22 of cladding 20 includes a grating 40 having grating elements 42 that extend inwardly into core 30 toward central axis 12. The grating elements 42 are disposed at different polar angles θ relative to central axis 12. The grating elements 42 run longitudinally down fiber 10 and are generally parallel to central axis 12. The grating elements 42 have a refractive index $n_g$, a width t, an edge-to-edge spacing or "gap width" a, and a height h. The grating element width t and the gap width a define a grating period $\Lambda = a+t$. The gap width a between adjacent grating elements 42 can also be defined in terms of a center-to-center angular spacing dθ via the relationship $d\theta = (a+t)/r$. In various examples, the inner surface 22 of cladding 20 is configured to have a number N of grating elements, wherein in various N satisfies 10≤N≤200 or 50≤N≤500 or 100≤N≤1000.

In various examples, grating 40 is configured so that the ratio NA satisfies $0.25 \leq \Lambda/\lambda \leq 1$ or $0.5 \leq \Lambda/\lambda \leq 1$ or $0.6 \leq \Lambda/\lambda \leq 0.1$. In various examples, grating 40 is configured so that the ratio t/a satisfies $0.2 \leq t/a \leq 10$ or $0.5 \leq t/a \leq 2.5$ or $1 \leq t/a \leq 2$.

In an example, grating elements 42 can have any reasonable X-Y cross-sectional shape, including for example a rectangular cross-sectional shape, a round cross-sectional shape, a rounded-edge cross-sectional shape, a triangular cross-sectional shape, etc. The cladding inner surface 22 with grating 40 acts to confine light 14 substantially to core 30 and to form guided modes from the confined light if cladding 20, grating period Λ and grating element height h are properly chosen, as described below.

Figure 3:
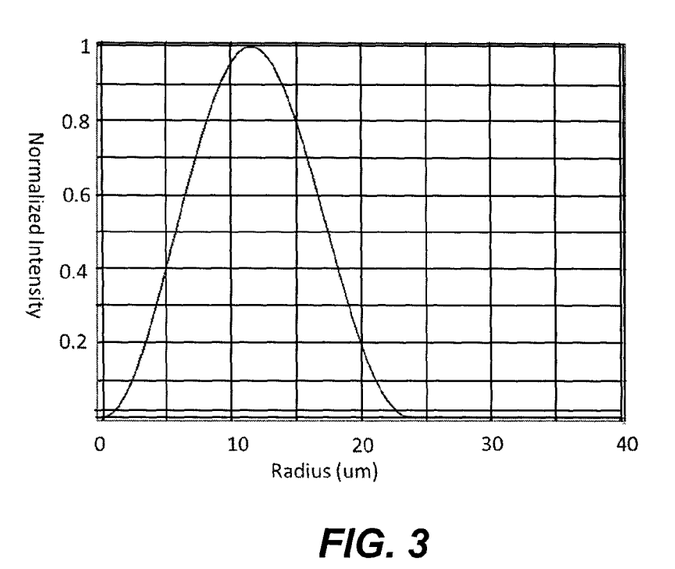
FIG. 3 is an example plot of the (calculated) normalized intensity as a function of radius (μm) across the fiber center for an example fiber E4.

FIG. 3 is an example plot of the (calculated) normalized intensity as a function of radius (μm) for the $LP_{11}$ mode for an example fiber 10 (example E4, set forth below), which has a core radius of 24.3 μm. The plot of FIG. 3 shows that light 14 is well confined to core 30.

In an example embodiment, fiber 10 has a relatively wide wavelength window of transmission (i.e., transmission bandwidth) Δλ. For the fiber parameters in examples E1 through E7 set forth in Table 1 below, the tunneling loss TL of the fundamental mode was calculated for the fundamental guided mode LP01 and the higher-order mode LP11 (the ring mode) for different wavelengths in the range from 1,400 nm to 1,700 nm. In various examples, the transmission bandwidth Δλ satisfies Δλ≥10 nm or Δλ≥30 nm or Δλ≥50 nm.

Example Fibers

Tables 1 through 7 are presented below just prior to the claims and set forth examples E1 through E31 of fiber 10. The Tables include the key fiber parameters as described above, as well as the real (re) and imaginary (im) components of the fiber's effective index $n_{eff}$, and the tunneling loss TL (dB/m). The tunneling loss TL is a logarithmic measure of how much optical power leaks from the guided mode as it travels down a given length of fiber 10. The values for the ratio Λ/λ in the Tables set forth below have been rounded to the third decimal place.

In an example embodiment, fiber 10 has a core radius r in the range 2 μm≤r≤2000 μm, a grating period to wavelength ratio Λ/λ in the range 0.5≤Λ/λ≤1, a grating element width to grating element spacing ratio t/a in the range 0.2≤t/a≤3, a grating element width to grating element height ratio t/h in the range 0.25≤t/h≤4, and a tunneling loss TL≤0.1 dB/m.

Table 1 below sets forth the first seven examples E1 through E7 of fiber 10 for which the core radius r=24.3 μm. The cladding 20 is pure silica with an index $n_{cl}$=1.444 at 1550 nm wavelength. The grating index $n_g$=3.5, the grating period Λ=1.272 μm, the air gap a=0.532 μm, the grating element width t=0.74 μm and the grating element height h=0.34 μm. The tunneling loss TL was calculated at wavelengths λ from 1,400 nm to 1,700 nm. It can be seen that the tunneling loss TL can be as low as 0.035 dB/m.

A relatively high grating index $n_g$ for grating elements 42 can be obtained by using non-silica-based materials such as chalcogenide glass, crystals and semiconductors. In examples where $n_{cl}$ is the refractive index of $SiO_2$ (i.e., $n_{Si}=n_{cl}$), the grating index $n_g$ satisfies $n_{Si}<n_g<5$, or $1.5 \cdot n_{Si} < n_g < 5$, or $2 \cdot n_{Si} < n_g < 5$.

Figure 4:
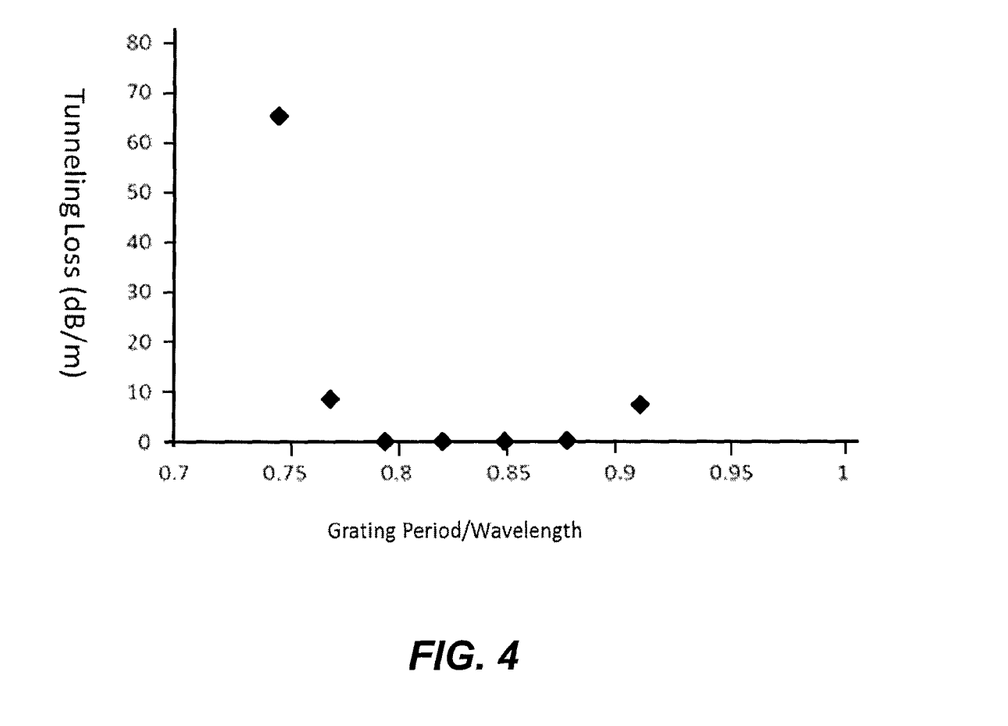
FIG. 4 is a plot of the tunneling loss TL (dB/m) versus Λ/λ for examples E1 through E7 of Table 1.

FIG. 4 is a plot of the tunneling loss TL (dB/m) versus Λ/λ for examples E1 through E7 of Table 1. The plot indicates that to have a low tunneling loss TL for the particular configurations for examples E1 through E7, the ratio Λ/λ can be the range $0.6 \leq \Lambda/\lambda \leq 1$.

Table 2 below sets forth examples E8 through E10. The fiber parameters are the same as those of example E4 in Table 1 above, with some exceptions. Specifically, for example E8, the core is made of silica with an index $n_c$=1.444. When silica is used as the core material, the tunneling loss increases to around 7.15 dB/m, indicating that the version of this fiber that has a hollow (air) core has better transmission performance.

Also, for example E9, the grating index $n_g$=1.444. The tunneling loss TL for this fiber is significantly larger than that for the counterpart example where the grating index was higher. Further, for example 10, there is no grating 40 at all by way of comparison of the tunneling losses. It is observed that the tunneling loss TL reaches a maximum of 276.34 in the absence of grating 40.

In the examples set forth in Tables 1 and 2, grating elements 42 each have a square cross-sectional shape.

Figure 5:
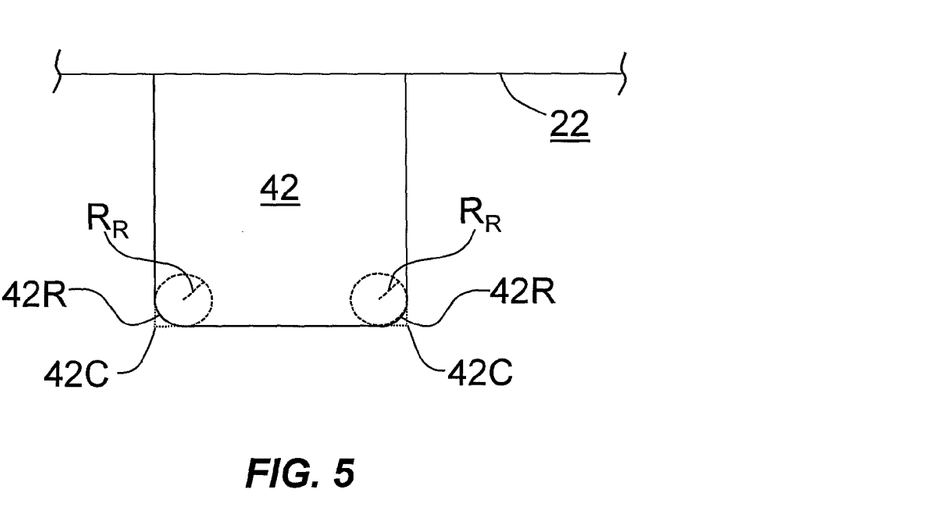
FIG. 5 is a close-up view of an example grating element that has rounded corners.

Table 3 below sets forth two examples E11 and E12 wherein grating elements 42 each have rounded corners. FIG. 5 is a close-up view of an example grating element 42 having rounded corners 42C. In examples E11 and E12, corners 42C have rounding radii $R_R$ of 50 nm and 100 nm, respectively. The tunneling loss TL is greater for example E12 than for example E11, indicating that the tunneling loss increases with an increasing rounding radius $R_R$. In an example, the rounding radius $R_R < 0.25 \cdot t$.

Table 4 and Table 5 set forth examples E13 through E21 that have an operating wavelength λ in the range from 1,550 nm to 1,600 nm, with grating index $n_g$=2.8, cladding index $n_{cl}$=1.444 and core index $n_c$=1. The other fiber parameters were optimized to have a minimum tunneling loss TL. The ratio t/a ranges from about 1.3 to about 2.3.

Table 6 sets forth examples E22 through E27 that have grating indices of $n_g$=1.5 (examples E22-E24) and $n_g$=2 (E25-E27). The core 30 is hollow with a core index $n_c$=1 (air). The cladding index $n_{cl}$ ranges from 1 to 1.2 and is used to reduce the tunneling loss TL. These examples show that, with careful design, a low-index grating 40 can be used to guide light 14 in core 30.

Figure 6:
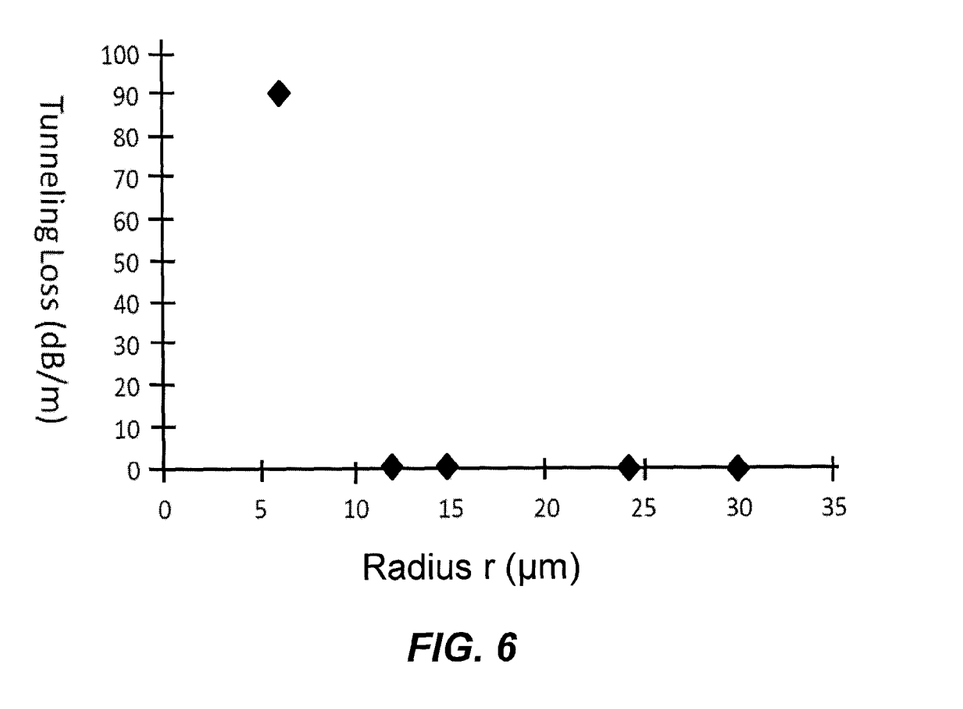
FIG. 6 is a plot of the tunneling loss TL (dB/m) versus the core radius r (μm) for fiber examples E4 and E28 through E31.

Table 7 sets for examples E28 through E31. The grating index is $n_g$=3.5. The core 30 is hollow with a core index $n_c$=1 (air), but the core has different radii (namely, r=15 μm, 12 μm, 6 μm and 30 μm, respectively) for the different examples. Examples E28 through E31 show that the tunneling loss TL decreases with increasing core radius. This effect is shown clearly in FIG. 6, where the tunneling loss TL (dB/m) is plotted versus the core radius r (μm) for fiber examples E4 and E28 through E31. FIG. 6 suggests that lower the tunneling loss, one can increase the core radius r.

Fabricating the Fiber

Figure 7A:
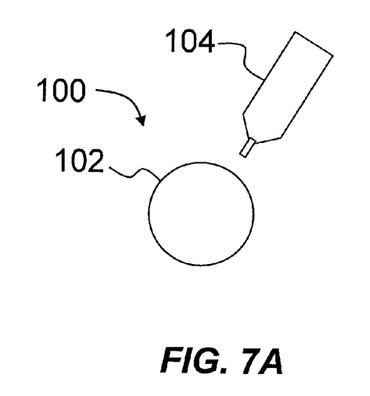
FIGS. 7A through 7D illustrate the basic steps associated with a first example embodiment of fabricating the low-index optical fiber disclosed herein.
Figure 7B:
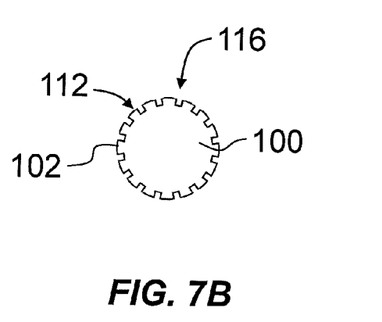

The fiber 10 can be fabricated using a number of different methods, and two example methods are discussed by way of illustration. The first example method utilizes outside vapor deposition (OVD) and the main steps are schematically illustrated in FIGS. 7A through 7D. FIG. 7A shows a cross-sectional view of a rod 100 that has a surface 102. In an example, rod 100 is made of carbon or a like material. The surface 102 is machined using a machining tool 104 to create a bait rod 116 with a periodic-grating surface structure 112, such as shown in FIG. 7B.

Figure 7C:
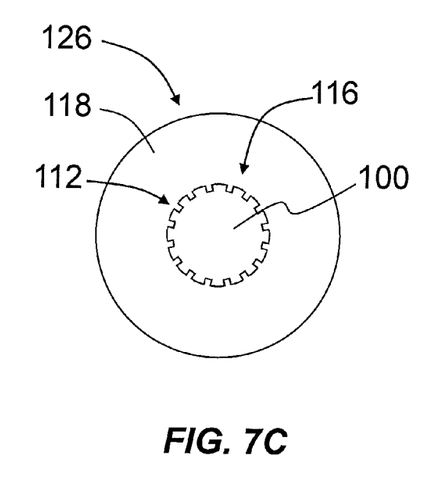
Figure 7D:
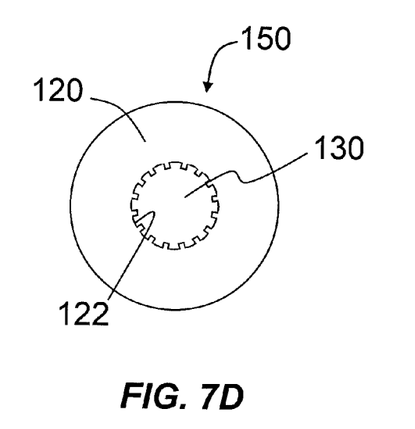

Next, silica soot is deposited onto bait rod 116 using OVD to form an outside soot layer 118, thereby forming a soot preform 126 as shown in FIG. 7C. An alternate method of forming soot perform 126 is to use a soot pressing method wherein bait rod 116 is placed into the center of a chamber filled with OVD soot. Then a high pressure is applied to the soot to press the soot onto bait rod 116 to form soot preform 126. The soot preform 126 is consolidated in a consolidation furnace to form a glass preform 150 wherein soot layer 118 is converted to a glass layer 120, as shown in FIG. 7D. During the consolidation process, bait rod 116 is disintegrated (e.g., burned), leaving a hollow core 130 in glass perform 150. The glass layer 120 has an inner surface with a periodic-grating surface structure 140 complementary to the periodic-grating surface structure 112 of bait rod 116. The glass preform 150 is then drawn using a standard fiber draw process to form fiber 10.

Figure 8A:
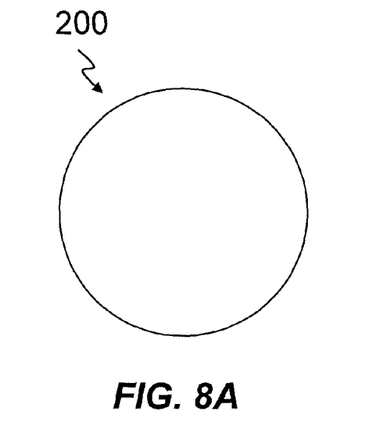
FIGS. 8A through 8D illustrate the basic steps associated with a second example embodiment of fabricating the low-index optical fiber disclosed herein.
Figure 8B:
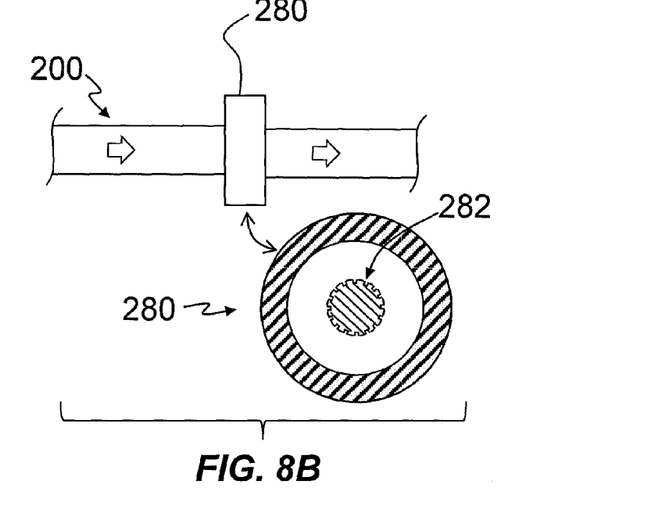
Figure 8C:
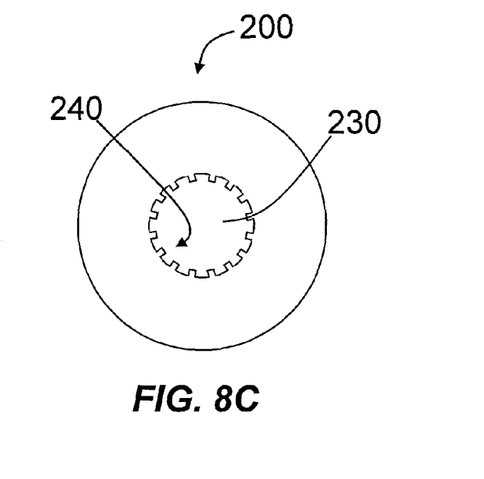
Figure 8D:
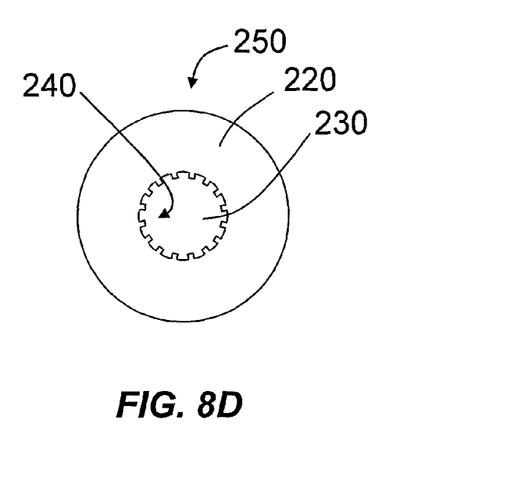

Another method of making a hollow-core preform based on extrusion is illustrated in FIGS. 8A through 8D. In FIG. 8A, a silica soot preform 200 is made, e.g., by using an OVD process or by using a soot pressing process. Then with reference to FIG. 8B, a hollow core 230 with surface grating 240 is formed in the soot preform by extruding the soot preform through an extrusion die 280, as shown in the close-up inset. The extrusion die 280 includes a periodic-grating 282 that is complementary to that of surface grating 240 and in fact defines the surface grating. The resulting soot preform 200 is shown in FIG. 8C. The soot preform 200 is then consolidated into a solid glass preform 250 (FIG. 8D) using a consolidation process that turns the soot to glass. The glass preform 250 now has an outer glass layer 220. The glass preform 250 of FIG. 8D is then drawn using a standard fiber draw process to form fiber 10.

TABLES 1-6

TABLE 2

| | Examples | | |
|---|---|---|---|
| | E8 | E9 | E10 (no grating) |
| $\lambda$ (nm) | 1,550 | 1,550 | 1,550 |
| $n_c$ | 1.444 | 1 | 1 |
| r (μm) | 24.3 | 24.3 | 24.3 |
| $n_g$ | 3.5 | 1.444 | N/A |
| $\Lambda$ (nm) | 1272 | 1272 | N/A |
| $\Lambda/\lambda$ | 0.821 | 0.821 | N/A |
| a (nm) | 532 | 532 | N/A |
| t (nm) | 740 | 740 | 0 |
| t/a | 1.391 | 1.391 | Infinity |
| h (nm) | 340 | 340 | N/A |
| $n_{cl}$ | 1.444 | 1.444 | 1.444 |
| $n_{eff}$(im) × $10^{-7}$ | 2.0311 | 51.143 | 78.522 |
| $n_{eff}$(re) | 0.999036 | 0.999689 | 0.999716 |
| TL (dB/m) | 7.15 | 179.98 | 276.34 |

TABLE 3

| | Examples | |
|---|---|---|
| | E11 | E12 |
| $\lambda$ (nm) | 1,550 | 1,550 |
| $n_c$ | 1 | 1 |
| r (μm) | 24.3 | 24.3 |
| $n_g$ | 3.5 | 3.5 |
| $\Lambda$ (nm) | 1272 | 1272 |
| $\Lambda/\lambda$ | 0.821 | 0.821 |
| a (nm) | 532 | 532 |
| t (nm) | 740 | 740 |
| t/a | 1.391 | 1.391 |
| h (nm) | 340 | 340 |
| $n_{cl}$ | 1.444 | 1.444 |
| $n_{eff}$(im) × $10^{-8}$ | 1.3877 | 3.3461 |
| $n_{eff}$(re) | 0.999220 | 0.999219 |
| TL (dB/m) | 0.49 | 1.18 |

TABLE 1

| Examples → | E1 | E2 | E3 | E4 | E5 | E6 | E7 |
|---|---|---|---|---|---|---|---|
| $\lambda$ (nm) | 1,400 | 1,450 | 1,500 | 1,550 | 1,600 | 1,650 | 1,700 |
| $n_c$ | 1 | 1 | 1 | 1 | 1 | 1 | 1 |
| r (μm) | 24.3 | 24.3 | 24.3 | 24.3 | 24.3 | 24.3 | 24.3 |
| $n_g$ | 3.5 | 3.5 | 3.5 | 3.5 | 3.5 | 3.5 | 3.5 |
| $\Lambda$ (nm) | 1,272 | 1,272 | 1,272 | 1,272 | 1,272 | 1,272 | 1,272 |
| $\Lambda/\lambda$ | 0.909 | 0.877 | 0.848 | 0.821 | 0.795 | 0.7711 | 0.748 |
| a (nm) | 532 | 532 | 532 | 532 | 532 | 532 | 532 |
| t (nm) | 740 | 740 | 740 | 740 | 740 | 740 | 740 |
| t/a | 1.391 | 1.391 | 1.391 | 1.391 | 1.391 | 1.391 | 1.391 |
| h (nm) | 340 | 340 | 340 | 340 | 340 | 340 | 340 |
| $n_{cl}$ | 1.444 | 1.444 | 1.444 | 1.444 | 1.444 | 1.444 | 1.444 |
| $n_{eff}$(im) × $10^{-9}$ | 199.78 | 5.6857 | 6.7367 | 7.3513 | 1.0299 | 257.09 | 2024.1 |
| $n_{eff}$(re) | 0.999371 | 0.999322 | 0.999272 | 0.999220 | 0.999164 | 0.999103 | 0.999628 |
| TL (dB/m) | 7.78 | 0.21 | 0.24 | 0.26 | 0.035 | 8.50 | 64.95 |

TABLE 4

| | Examples | | | | |
|---|---|---|---|---|---|
| | E13 | E14 | E15 | E16 | E17 |
| $\lambda$ (nm) | 1,550 | 1,550 | 1,550 | 1,550 | 1,550 |
| $n_c$ | 1 | 1 | 1 | 1 | 1 |
| r (µm) | 24.3 | 24.3 | 24.3 | 24.3 | 24.3 |
| $n_g$ | 2.8 | 2.8 | 2.8 | 2.8 | 2.8 |
| $\Lambda$ (nm) | 1,272 | 1,060 | 1,060 | 1,060 | 1,060 |
| $\Lambda/\lambda$ | 0.821 | 0.684 | 0.684 | 0.684 | 0.684 |
| a (nm) | 532 | 320 | 365 | 365 | 365 |
| t (nm) | 740 | 740 | 695 | 695 | 695 |
| t/a | 1.391 | 2.313 | 1.904 | 1.904 | 1.904 |
| h (nm) | 340 | 340 | 340 | 310 | 320 |
| $n_{cl}$ | 1.444 | 1.444 | 1.444 | 1.444 | 1.444 |
| $n_{\mathit{eff}}$(im) × $10^{-8}$ | 142.85 | 0.30210 | 6.0938 | 21.373 | 4.0883 |
| $n_{\mathit{eff}}$(re) | 0.999707 | 0.999237 | 0.999228 | 0.999189 | 0.999219 |
| TL (dB/m) | 50.27 | 10.63 | 2.14 | 7.52 | 1.44 |

TABLE 5

| | Examples | | | |
|---|---|---|---|---|
| | E18 | E19 | E20 | E21 |
| $\lambda$ (nm) | 1,550 | 1,600 | 1,500 | 1,550 |
| $n_c$ | 1 | 1 | 1 | 1 |
| r (µm) | 24.3 | 24.3 | 24.3 | 30 |
| $n_g$ | 2.8 | 2.8 | 2.8 | 2.8 |
| $\Lambda$ (nm) | 1,060 | 1,060 | 1,060 | 1,059 |
| $\Lambda/\lambda$ | 0.684 | 0.663 | 0.707 | 0.683 |
| a (nm) | 365 | 365 | 365 | 364 |
| t (nm) | 695 | 695 | 695 | 695 |
| t/a | 1.904 | 1.904 | 1.904 | 1.909 |
| h (nm) | 330 | 330 | 330 | 330 |
| $n_{cl}$ | 1.444 | 1.444 | 1.444 | 1.444 |
| $n_{\mathit{eff}}$(im) × $10^{-8}$ | 4.01444 | 87.009 | 75.864 | 3.989143 |
| $n_{\mathit{eff}}$(re) | 0.999223 | 0.999666 | 0.999666 | 0.999800 |
| TL (dB/m) | 1.41 | 29.66 | 27.59 | 1.40 |

TABLE 6

| | $n_g$ = 1.5 | | | $n_g$ = 2 | | |
|---|---|---|---|---|---|---|
| Examples → | E22 | E23 | E24 | E25 | E26 | E27 |
| $\lambda$ (nm) | 1,550 | 1,550 | 1,550 | 1,550 | 1,550 | 1,550 |
| $n_c$ | 1 | 1 | 1 | 1 | 1 | 1 |
| r (µm) | 24.3 | 24.3 | 24.3 | 24.3 | 24.3 | 24.3 |
| $n_g$ | 1.5 | 1.5 | 1.5 | 2 | 2 | 2 |
| $\Lambda$ (nm) | 1,060 | 1,060 | 1,060 | 1,060 | 1,060 | 1,060 |
| $\Lambda/\lambda$ | 0.684 | 0.684 | 0.684 | 0.684 | 0.684 | 0.684 |
| a (nm) | 365 | 365 | 365 | 365 | 365 | 365 |
| t (nm) | 695 | 695 | 695 | 695 | 695 | 695 |
| t/a | 1.904 | 1.904 | 1.904 | 1.904 | 1.904 | 1.904 |
| h (nm) | 330 | 330 | 330 | 330 | 330 | 330 |
| $n_{cl}$ | 1 | 1.1 | 1.2 | 1 | 1.1 | 1.2 |
| $n_{\mathit{eff}}$(im) × $10^{-6}$ | 0.007993 | 2.9935 | 3.63 | 0.00760 | 1.4861 | 2.1699 |
| $n_{\mathit{eff}}$(re) | 0.9996890 | 0.999692 | 0.999693 | 0.999696 | 0.999700 | 0.999700 |
| TL (dB/m) | 0.28 | 105.35 | 127.74 | 0.27 | 52.30 | 76.36 |

TABLE 7

| | Examples | | | |
|---|---|---|---|---|
| | E28 | E29 | E30 | E31 |
| $\lambda$ (nm) | 1,550 | 1,550 | 1,550 | 1,550 |
| $n_c$ | 1 | 1 | 1 | 1 |
| r (µm) | 15 | 12 | 6 | 30 |
| $n_g$ | 3.5 | 3.5 | 3.5 | 3.5 |
| $\Lambda$ (nm) | 1,256 | 1,256 | 1,256 | 1,256 |

TABLE 7-continued

| | Examples | | | |
|---|---|---|---|---|
| | E28 | E29 | E30 | E31 |
| $\Lambda/\lambda$ | 0.810 | 0.810 | 0.810 | 0.810 |
| a (nm) | 516 | 516 | 516 | 516 |
| t (nm) | 740 | 740 | 740 | 740 |
| t/a | 1.434 | 1.434 | 1.434 | 1.434 |
| h (nm) | 340 | 340 | 340 | 340 |
| $n_{cl}$ | 1.444 | 1.444 | 1.444 | 1.444 |
| $n_{\mathit{eff}}$(im) × $10^{-7}$ | 0.12512 | 0.1606 | 2.5710 | 0.030712 |
| $n_{\mathit{eff}}$(re) | 0.997911 | 0.996692 | 0.994802 | 0.999491 |
| TL (dB/m) | 0.44 | 0.57 | 90.48 | 0.11 |

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. An optical fiber configured to guide light of an operating wavelength $\lambda$ in at least one guided mode, comprising:
   a solid and generally cylindrical annular cladding having a refractive index $n_{cl}$, a central axis, an inner surface with a radius r wherein r≥2 µm, an outer surface with a radius R and an annular thickness ΔR=R−r, wherein ΔR≥10 µm;

a core disposed along the central axis and surrounded by the cladding, the core having the radius r and a refractive index $n_c$, wherein $n_{cl}>n_c$; and a grating defined by grating elements that extend from the cladding inner surface into the core and that run generally parallel to the central axis, the grating elements defining a period Λ, a width t, a spacing a and a height h, wherein 0.5≤Λ/λ≤1 and wherein 0.2≤t/a≤3.

2. The optical fiber of claim 1, wherein 6 µm≤r≤200 µm.

3. The optical fiber of claim 1, wherein the core consists of air.

4. The optical fiber of claim 1, wherein the core comprises silica.

5. The optical fiber of claim 1, wherein the fiber has a tunneling loss TL, wherein TL≤0.1 dB/m.

6. The optical fiber of claim 1, wherein the cladding is a unitary structure consisting of a single material.

7. The optical fiber of claim 1, wherein 0.75≤Λ/λ≤0.95.

8. The optical fiber of claim 1, wherein 0.25≤t/h≤4.

9. The optical fiber of claim 1, wherein $n_g \geq n_{cl}$.

10. The optical fiber of claim 1, wherein the grating elements each have a rectangular cross-sectional shape.

11. The optical fiber of claim 1, wherein the operating wavelength λ is in the range from 1,400 nm to 1,700 nm.

12. An optical fiber configured to guide light of an operating wavelength λ in at least one guided mode, comprising:

a solid and generally cylindrical annular cladding having a refractive index $n_{cl}$, a central axis, an inner surface with a radius r wherein 2 µm≤r≤200 µm and an outer surface with a radius R;

a hollow core defined by the cladding inner surface, the hollow core having the radius r and a nominal refractive index $n_c=1$, wherein $n_{cl}>n_c$; and a grating defined by grating elements that extend from the cladding inner surface into the core, the grating elements running longitudinally down the fiber and being generally parallel to the central axis, wherein the grating elements have a width t, a spacing a and a height h and define a grating period Λ=t+a, wherein 0.5≤Λ/λ≤1.

13. The optical fiber of claim 12, wherein the fiber includes at least one of the following properties:

a) 0.2≤t/a≤3;
b) 0.75≤Λ/λ≤0.95;
c) a tunneling loss TL, wherein TL≤0.1 dB/m;
d) 0.25≤t/h≤4; and
e) $n_g \geq n_{cl}$.

14. The optical fiber of claim 12, wherein the cladding consists of a single material.

15. The optical fiber of claim 12, wherein the cladding has an annular thickness ΔR=R−r, wherein ΔR≥10 µm.

16. The optical fiber of claim 12, wherein the grating elements each have a rectangular cross-sectional shape.

17. The optical fiber of claim 12, wherein the operating wavelength λ is in the range from 1,400 nm to 1,700 nm.

18. A method of forming an optical fiber configured to guide light of an operating wavelength λ in at least one guided mode, comprising:

forming a bait rod having an outer surface with a first periodic grating formed therein;

depositing a silica soot layer onto the outer surface of the bait rod to form a soot preform;

consolidating the soot preform to form a glass preform, wherein the soot layer is converted to a glass layer and wherein the bait rod is disintegrated to form a hollow core in the glass preform, and wherein the glass layer has an inner surface with a second periodic-grating surface structure that is complementary to the first periodic-grating surface structure; and drawing the glass preform to form the optical fiber, wherein the optical fiber has the following properties:

i) a solid and generally cylindrical annular cladding having a refractive index $n_{cl}$, a central axis, an inner surface with a radius r wherein 2 µm≤r≤200 µm, an outer surface with a radius R and an annular thickness ΔR=R−r, wherein ΔR≥10 µm;

ii) a hollow core defined by the cladding inner surface, the hollow core having the radius r and a nominal refractive index $n_c=1$, wherein $n_{cl}>n_c$; and iii) a grating defined by grating elements that extend from the cladding inner surface into the core, the grating elements running longitudinally down the fiber and being generally parallel to the central axis, wherein the grating elements have a width t, a spacing a and a height h and define a grating period Λ=t+a, wherein 0.5≤Λ/λ≤1.

19. The method of claim 18, wherein the soot layer is formed by either an outside-vapor-deposition method or a soot-pressing method.

20. The method of claim 18, wherein the optical fiber includes at least one of the following properties:

a) 0.2≤t/a≤3;
b) 0.75≤Λ/λ≤0.95;
c) a tunneling loss TL, wherein TL≤0.1 dB/m;
d) 0.25≤t/h≤4; and
e) $n_g \geq n_{cl}$.

21. A method of forming an optical fiber configured to guide light of an operating wavelength λ in at least one guided mode, comprising:

extruding a soot preform through an extrusion die that includes a first periodic-grating structure to define a hollow core with an inner surface that includes a second periodic surface grating complementary to the first periodic-grating structure;

consolidating the extruded soot preform into a glass preform; and drawing the glass preform to form the optical fiber, wherein the optical fiber has the following properties:

i) a solid and generally cylindrical annular cladding having a refractive index $n_{cl}$, a central axis, an inner surface with a radius r wherein 2 µm≤r≤200 µm, an outer surface with a radius R and an annular thickness ΔR=R−r, wherein ΔR≥10 µm;

ii) a hollow core defined by the cladding inner surface, the hollow core having the radius r and a nominal refractive index $n_c=1$, wherein $n_{cl}>n_c$; and iii) a grating defined by grating elements that extend from the cladding inner surface into the core, the grating element running longitudinally down the fiber and being generally parallel to the central axis, wherein the grating elements have a width t, a spacing a and a height h and define a grating period Λ=t+a, wherein 0.5≤Λ/λ≤1.

22. The method of claim 21, wherein the optical fiber includes at least one of the following properties:

a) 0.2≤t/a≤3;
b) 0.75≤Λ/λ≤0.95;
c) a tunneling loss TL, wherein TL≤0.1 dB/m;
d) 0.25≤t/h≤4; and
e) $n_g \geq n_{cl}$.

* * * * *